May 25, 1926.

W. G. WILSON

VALVE

Filed Jan. 4, 1923 2 Sheets-Sheet 1

1,586,347

INVENTOR.
Wylie G. Wilson
BY
Stewart Perry
his ATTORNEYS.

Patented May 25, 1926.

1,586,347

UNITED STATES PATENT OFFICE.

WYLIE G. WILSON, OF JERSEY CITY, NEW JERSEY, ASSIGNOR TO LOOSE SEAT VALVE COMPANY, A CORPORATION OF DELAWARE.

VALVE.

Application filed January 4, 1923. Serial No. 610,580.

This invention relates to an improvement in valves and has particular reference to means for operating the sealing element of a valve in cooperation with its seat. Heretofore it has been the practice to operate said sealing member through the medium of a valve stem, which in turn was operated positively by suitable means to lift the sealing element off its seat, and to restore said sealing element to its seat, and by a further action of said stem operating means to compress the sealing element to its seat with the full and positive operative force of such stem operating means.

Objections have been found to such apparatus for the reason that in the hands of careless or unskilled operators, the stem operating means may cause the sealing element to bear on its seat with a degree of pressure which may be detrimental to both the sealing element and its seat. The purpose of this invention is to provide means for obviating said objectionable features.

This improvement is accomplished by a construction wherein the valve stem is divided into two sections and an elastic element is interposed between said sections. The valve operating means, operating directly on one of said sections and through the medium of cooperating detents or stops carried by said sections of the stem, operating to lift the sealing element from its seat, and through the medium of said elastic element operating to restore said sealing element to its seat and to cause said sealing element to bear on its seat with an elastic pressure. Said valve operating means being so restricted in its movement as to cause compression of the elastic element within predetermined limitations, thus limiting the degree to which the elastic element can be compressed, and hence the degree of pressure on the valve elements.

The importance of such limitation of possible pressure exerted on the valve elements, is particularly manifest where a fragile material, such as glass, is employed in the construction of such valve elements, but it is also apparent when soft metals are employed in such construction, indeed it is beneficial under all circumstances and conditions.

The invention is illustrated in the accompanying drawings, wherein the parts are indicated by numerals, like numerals having reference to like parts.

Figure 2 is a vertical section of part of Figure 1, taken in a plane at right angles to the plane in which Figure 1 is taken.

Figure 1:
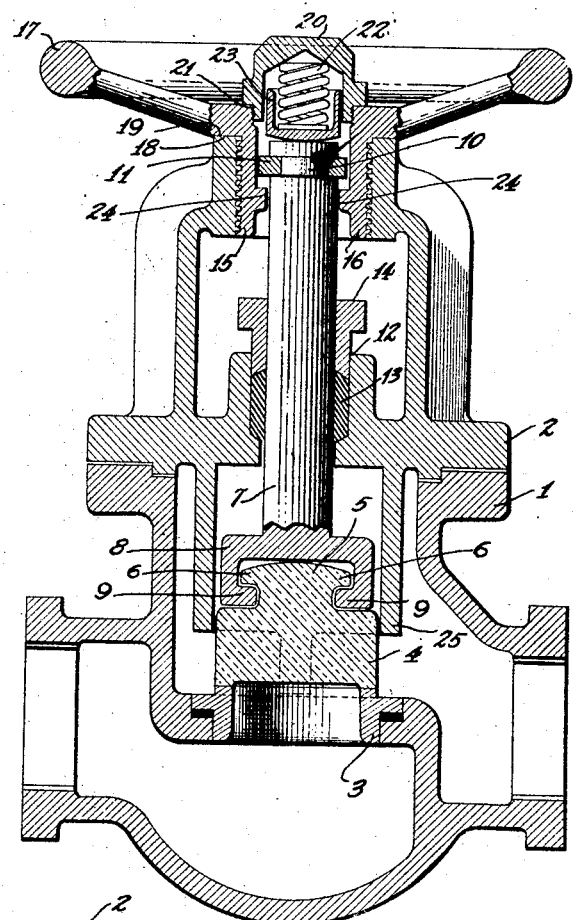
Figure 1 is a vertical section partly in elevation—showing the valve closed.
Figure 2:
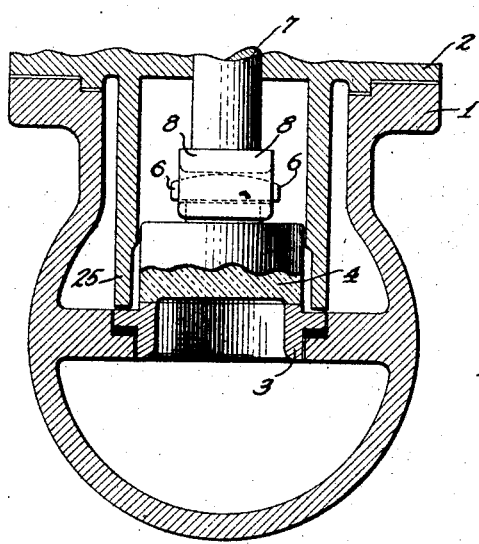
Figure 3:
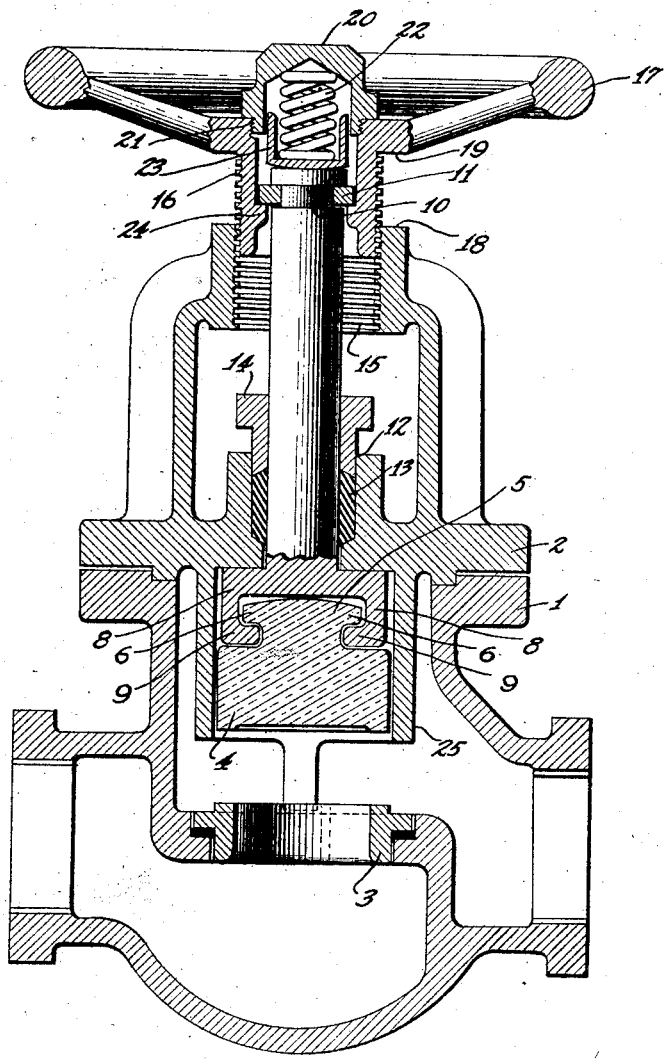
Figure 3 is a vertical section in the same plane as Figure 1, showing the valve open.

1 is a casing and 2 a head for the same. 3 is a valve seat and 4 a sealing element adapted to cooperate with said seat. The sealing element is preferably formed with a head 5 having two flanges, as 6—6. The valve stem is divided into two sections. 7 is one section. One end of said section 7, is provided with a bifurcated member as 8, with inturned flanges as 9—9, said bifurcated element being adapted to embrace the flanges 6—6 of the head 5 when said head is introduced within the arms thereof in a line at right angles to the axis of the stem section. The other end of the stem section 7 is provided with an annular indentation or recess as 10, and 11 is a split ring or detent adapted to be sprung into said recess 10, to serve as a means for operating said section 7 of the stem when engaged by a detent later to be described.

The section 7 of the stem is mounted to reciprocate within an aperture 12 of the valve casing head 2 where it is sustained and sealed by the usual gasket as 13, in cooperation with the gland 14.

A screw threaded aperture as 15 is provided in the head 2 of the casing. 16 is an externally screw threaded cylindrical element adapted to be screwed into the aperture 15 by means of the hand wheel 17. The element 16 is the other section of the valve stem, said sections 7 and 16 being mounted in axial alignment. The thrust of such screw threaded member 16, being limited by the contact faces 18 of the casing and 19 of the cylindrical member 16. 20 is a hollow cap having a screw thread connection with said cylindrical member 16 at 21. 22 is an elastic element as a helical spring mounted within the hollow cap 20 and preferably seated at one end in a bearing cup 23 which rests on the end of the stem section 7. 24—24 are detents formed on the interior of the cylindrical member 16 adapted to engage the collar 11, as stated. 25 is an annular member or skirt dependent from the casing head 2 within which the sealing element 4 is mounted to reciprocate. Said dependent member 25 serves as a guide for the sealing element, and also as means for preventing the displacement of the locking engagement between the sealing element and the bifurcated end of the section 7 of the stem, when these are united and drawn within its embrace.

The operation of the device is as follows: when the hand wheel 17 is turned to open the valve, the cylindrical member is thereby rotated and the cooperating threads cause said member 16 to move out of its aperture, thus bringing the detents 24 into engagement with the collar 11, thus operating to lift the sealing element off its seat. A reverse movement of the hand wheel 17 will cause the cap 20 to bear on the spring 22 and the spring 22 to bear on the end of the section 7 of the stem, thus seating the sealing element 4, but without compression. A further movement of the hand wheel will operate to compress the spring 22, until the faces 18 and 19 are in engagement at which time the spring will be partly compressed, all within predetermined limitations of movement and degrees of compression as the circumstance of the case may require.

Hence it will be impossible for a careless or inexperienced operator to cause the valve operating mechanism to bear on the sealing element and the valve seat with a pressure greater than that prescribed by the law of its structure, i. e. beyond predetermined limitations.

It will be noted therefore, that the mechanism comprises a valve stem divided into two parts, one of which is 7 and the other 16, and its accompanying parts, and that an elastic element as 22 is interposed between them, and all of these elements are mounted in axial alignment.

In the operation of this mechanism the mechanically produced crushing stress on the valve elements is definitely predetermined, and is in the form of an elastic pressure. Should the valve elements or the casing of the valve expand or contract due to temperature changes, still the mechanically produced crushing stress is in the form of a yieldable elastic pressure, and therefore the valve elements are freed from the destructive crushing stresses which today occur in rigidly screwed down valves when a hot fluid is suddenly passed through the valve, expanding the more completely immersed valve elements before the casing expands; or when an external chilling contracts the casing before the contained valve elements contract; or crushing stress due to the fact that the valve elements are constructed (as they frequently are) of metal which has a greater coefficient of expansion than does the material of which the casing is constructed, both valve elements and casing being equally heated after the valve is screwed down on its seat.

What I claim is:

1. In a valve, a valve seat and a sealing element adapted to cooperate therewith, a valve stem suitably mounted to reciprocate within the valve casing and within a cylindrical element mounted in the casing in axial alignment with said stem, said stem carrying at one end said sealing element and provided at the other end with a suitable detent to cooperate with a detent on the inner periphery of said cylindrical element, a hollow cap mounted on said cylindrical element with a spring interposed between the interior of said cap and the end of said stem, said cylindrical member being externally screw-threaded to mesh with corresponding screw threads formed in an aperture of the casing, means to rotate said cylindrical element to lift the sealing element from its seat by engagement of said detents, and to restore the same to its seat by reverse movement of said cylindrical element, the parts being adjusted so that after the sealing element is seated a further rotation of the cylindrical element will cause a compression of the spring and hence produce an elastic pressure on the sealing element to hold the same in a seated position, with means to limit the movement of said cylindrical element for the purpose of limiting the degree of pressure brought to bear upon said elastic element and hence upon said sealing element.

2. In a valve a valve seat, a sealing element adapted to cooperate therewith, said sealing element having a head with transverse protuberances, a valve stem suitably mounted to reciprocate within the valve casing and provided at one end with a bifurcated element adapted to cooperate with the head of said sealing element, said head being adapted to slide transversely between the arms of said bifurcated member, the opposite end of said stem being provided with an annular recess and a ring member of greater diameter than the stem, adapted to be freely mounted within said annular recess, operating means for said sealing element comprising a cylindrical member provided internally with a peripheral detent adapted to engage said ring, a cap for said cylindrical member, with a spring interposed between the interior of said cap and the end of said stem, said cylindrical member being externally screw-threaded to mesh with corresponding screw threads in an aperture of the casing, said cylindrical member and stem being coaxially mounted, and means to rotate said cylindrical member, and means to limit the extent of its thrust, the parts being so adjusted and proportioned that when the sealing element is primarily seated its operative means function to compress said spring within predetermined limitations, thus causing the sealing element to bear upon its seat within predetermined limitations of pressure corresponding to the degree of pressure on the spring.

3. In a valve, a valve stem divided into two sections, one of which is cylindrical in form and externally screw threaded to mesh with a corresponding screw threaded aperture in the valve casing, with means external of the casing to rotate the same, and means to limit such rotation and the thrust thereof by a positive engagement between said section and said casing, a cap for the cylindrical section and an elastic element mounted therein, and a detent within said cylindrical section, the other section of said stem provided at one end with a shoulder adapted to cooperate with said detent within the cylindrical section and carrying at the other end a valve sealing element adapted to cooperate with a suitable valve seat, said sections of said stem and the elastic element being mounted to operate coaxially, with said elastic element interposed between said sections, the relation of the elements being such that when the cylindrical section of the stem is rotated in one direction the sealing element will be lifted from its seat through engagement of said detent within said cylindrical section with said shoulder and when rotated in the reverse direction the sealing element will, through the medium of said elastic element, be seated and pressed to its seat by the compression of said elastic element within the limitations of the thrust of said cylindrical section as prescribed by the positive engagement between said cylindrical section and said casing.

Signed by me at Jersey City this 2nd day of January 1923.

WYLIE G. WILSON.